Willard and Ross,
Mower.
No. 1781 Reissued Sept. 27. 1864
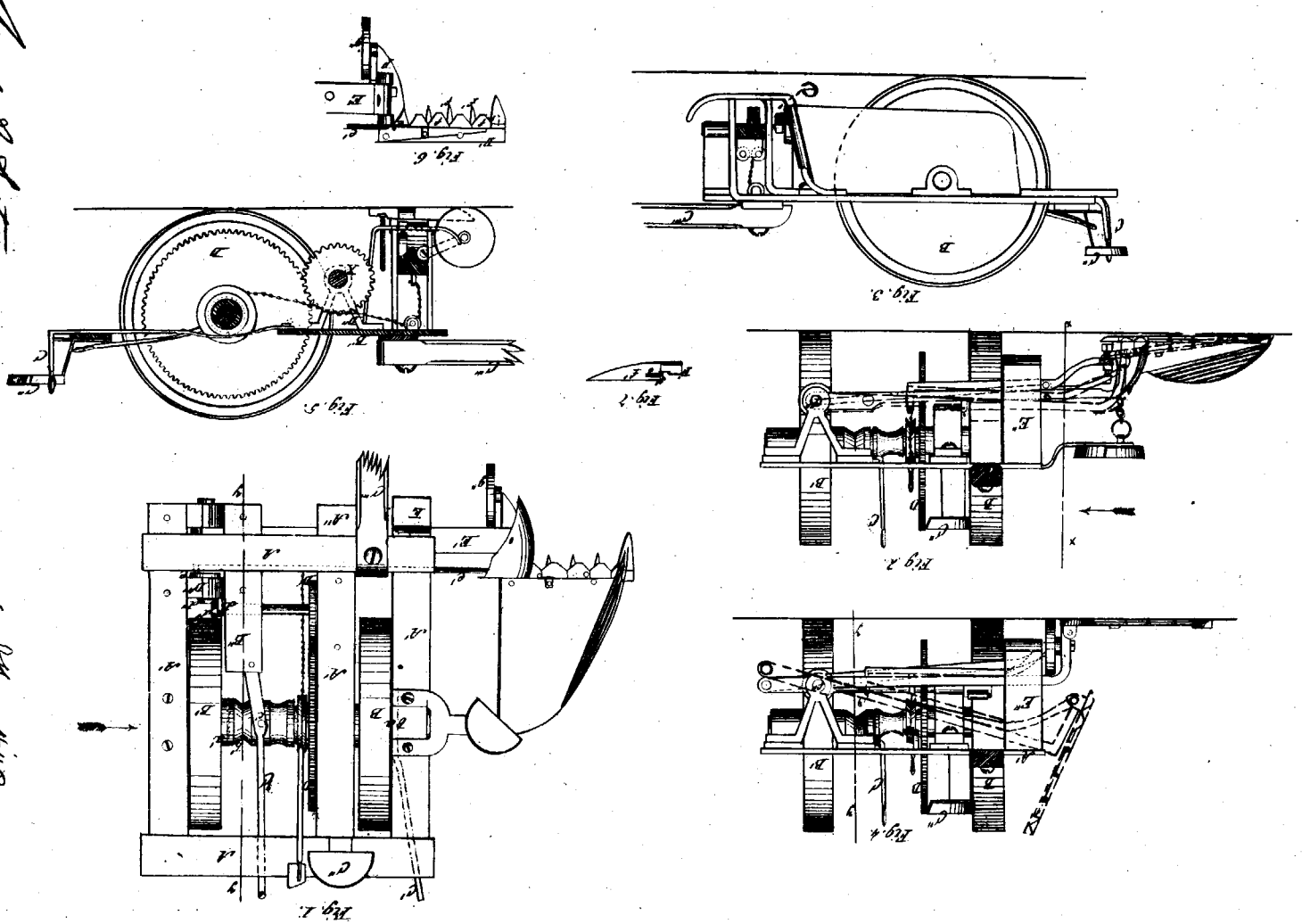
James A. Sexton,
By his Attorney
Thos. H. Dodge
Witnesses { J. Henry Hill
Elijah D. Dodge

UNITED STATES PATENT OFFICE.

JAMES A. SAXTON, OF CANTON, OHIO, ASSIGNEE, BY MESNE ASSIGNMENTS, OF HOSEA WILLARD AND ROBT. ROSS.

IMPROVEMENT IN HARVESTERS.

Specification forming part of Letters Patent No. 18,562, dated November 3, 1857; Reissue No. 1,781, dated September 27, 1864.

*To all whom it may concern:*

Be it known that HOSEA WILLARD, of Vergennes, in the county of Addison and State of Vermont, and ROBERT ROSS, formerly of same place, but now residing at St. Albans, in the county of Franklin, in said State, invented certain new and useful Improvements in Grain and Grass Harvesting Machines, of which the following is a full, clear, and exact description, reference being had to the accompanying drawings, which make a part of this specification, and in which—

Figure 1 is a plan or top view, showing one mode of applying said improvements when the machine is to be used as a reaper. Fig. 2 represents a front view of Fig. 1, with the leading-wheel removed to show the parts in rear of it more fully, the coupling-arm, finger-beam, and platform being shown in different positions to illustrate the flexible connection of the finger-beam with the machine. Fig. 3 represents a section and side view on line *x x*, Fig. 2, when the parts are in the position shown in black lines. Fig. 4 represents in black lines a front view of the machine when arranged for mowing, and in blue and red lines two of the different positions which the finger-beam and cutting apparatus are made to assume when being prepared or folded for transportation. Fig. 5 represents a section on lines *y y*, Figs. 1 and 4, when the machine is arranged for mowing, as shown in black lines, Fig. 4. Fig. 6 represents a plan or top view of finger bar or beam F′, shoe F, leading-wheel *g″*, and part of the coupling-arm or finger-bar extension-piece E′; and Fig. 7 represents a side view of one of the fingers and an end or cross-section of the finger bar or beam, showing how a part of the finger is made to rise up by the front edge of the bar to keep the cutter-bar from working forward.

The side of the machine which runs next to the standing grain I call the "inside," and that which runs next to cut grass or grain I call the "outside."

In the accompanying drawings, the main frame, which is of rectangular form, is represented by letters A A A′ A′. To the under side of the parts A′ A′ are fastened the bearings of the main shaft of the journal of the driving and supporting wheels B B′. To the inner hub of the latter is fastened a ratchet wheel or device, *a′*, while a similar ratchet device, *a*, is fastened to the outer hub or side of wheel B. Wheels B B′, with their hub-ratchets, are fitted loosely on shaft X. A sliding ratchet-wheel or device, *b′*, works on shaft X, and is so connected therewith as to be revolved when said shaft revolves, but is susceptible of a lateral movement, so that it can be moved in and out of action with ratchet *a′* by means of pin *c′* in lever C, whose front end is pivoted to the under side of piece B″, fastened to the front of the frame. Pin *c′* fits into a groove turned in the part *b′*, so that the part *b′* operates like a sliding revolving clutch. A similar ratchet or clutch, *b*, is fitted to be worked by lever C′ on the outside of wheel B.

C″ is the driver's seat, which is fastened to the rear of main frame, and in such a position as that levers C and C′ are both within his reach.

As the machine is drawn forward by tongue C‴ (shown in section) wheels B B′ revolve, and when both or either of the clutches *b b′* are in action with their respective ratchets *a a′*, shaft X is caused to revolve, together with cog-wheel D, fastened thereto, and which gears into cog-wheel D′ on a shaft, X′, supported at one end by hanger D″, depending from piece A″, and at the other in a projection, *d*, from hanger D‴, in which the short crank-shaft turns, the latter having on its rear end a bevel-gear, *d″*, which is operated by bevel-gear, *d′*, on the end of shaft X′.

On the front end of the crank-shaft is fitted a balance-wheel, *e*, with a crank pin, upon which is placed the outer end of the pitman *e′*, which gives motion to the cutter-bar *e″*, to which are attached teeth *f*, which work as they vibrate through slotted open fingers *f′*.

In mowing and reaping machines it is found that the shorter the guards, other things being equal, the better the machine works, as there is less danger of short guards being broken or bent than long ones. It is necessary, however, to have cutters of proper length, and of course the guards must be long enough to protect the cutters and allow them full play.

To promote these ends is the object of one part of the improvements which form the subject-matter of this patent, and which consists in placing the cutter-bar on the front of the finger beam or bar, in combination with so casting or forming the fingers that a part of the fingers will project up in front of the finger-bar to answer as front guides to the cutter-bar. This is illustrated in Fig. 7, in which $f'$ is the finger, having a slot, $s$, for the cutters $f$ to work through, while the part $s'$ extends above the top of the finger-bar F′. The fingers are fastened to the under side of the finger-bar by means of bolts or rivets passing through rear projections, $t$, which pass under the finger-bar. In this instance the finger-bar is grooved out to afford a back guide to the cutter-bar.

By the above construction the fingers can be quite short, and consequently cast or malleable iron guards can be used with advantage.

When the machine is used for reaping the finger-beam is required to be set out from the frame, as seen in Figs. 1 and 2, and to avoid the necessity of using separate coupling-arms when these changes are required the coupling-arm E′ is made long, and is provided with two holes, as fully shown in Figs. 2 and 4, whereby the same coupling-arm is made to answer for both mowing and reaping, as fully indicated in the drawings, the loop E″ giving a proper support to the coupling-arm in either case, as it works up and down on its hinge $f''$ to enable the finger-beam to conform to the inequalities of the ground.

What is claimed under this patent as the invention of said WILLARD and ROSS is—

The combination, with the finger beam or bar and the main frame of a two-wheel machine, of an adjustable hinged coupling-arm, substantially as and for the purposes set forth.

In witness whereof I hereunto subscribe my name.

JAMES A. SAXTON.

In presence of—
GEO. E. BALDWIN,
S. SURBURG.